United States Patent
Ryu et al.

(10) Patent No.: US 8,194,419 B2
(45) Date of Patent: Jun. 5, 2012

(54) SWITCHING MODE POWER SUPPLY FOR REDUCING STANDBY POWER

(75) Inventors: Byoung Woo Ryu, Suwon-si (KR); Gun Woo Moon, Daejeon-si (KR); Seong Wook Choi, Daejeon-si (KR); Byoung Hee Lee, Daegu-si (KR); Dong Seong Oh, Incheon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 582 days.

(21) Appl. No.: 12/371,246

(22) Filed: Feb. 13, 2009

(65) Prior Publication Data

US 2010/0156509 A1 Jun. 24, 2010

(30) Foreign Application Priority Data

Dec. 19, 2008 (KR) ........................ 10-2008-0130094

(51) Int. Cl.
*H02M 3/335* (2006.01)
(52) U.S. Cl. ........................ 363/21.04; 363/78; 363/81
(58) Field of Classification Search .................. 323/207, 323/282, 284; 363/78, 81, 84, 89; 307/126
See application file for complete search history.

(56) References Cited

U.S. PATENT DOCUMENTS

| | | | | |
|---|---|---|---|---|
| 6,157,177 | A * | 12/2000 | Feldtkeller | 323/267 |
| 6,714,425 | B2 * | 3/2004 | Yamada et al. | 363/21.12 |
| 7,012,818 | B2 * | 3/2006 | Kotsuji et al. | 363/21.01 |
| 7,166,660 | B2 * | 1/2007 | Staniek | 524/121 |
| 7,176,660 | B2 * | 2/2007 | Usui et al. | 323/207 |
| 7,492,619 | B2 * | 2/2009 | Ye et al. | 363/97 |
| 7,675,758 | B2 * | 3/2010 | Artusi et al. | 363/21.01 |
| 7,911,811 | B2 * | 3/2011 | Wheeler et al. | 363/21.01 |
| 2003/0042879 | A1 * | 3/2003 | Huh et al. | 323/282 |
| 2006/0087298 | A1 * | 4/2006 | Turchi | 323/265 |
| 2009/0129130 | A1 * | 5/2009 | Young et al. | 363/84 |

FOREIGN PATENT DOCUMENTS

KR 10-2002-0023022 A 3/2002
KR 10-2006-0104573 A 10/2006

* cited by examiner

*Primary Examiner* — Adolf Berhane
*Assistant Examiner* — Lakaisha Jackson
(74) *Attorney, Agent, or Firm* — Lowe, Hauptman, Ham & Berner, LLP

(57) ABSTRACT

A switching mode power supply includes an EMI filter unit, a PFC unit, a DC/DC unit, a PFC controller including a feedback stage to which a link voltage at an output side of the PFC unit is fed back and an overvoltage protection stage, a DC/DC controller generating a burst mode operation signal in a light-load or no-load condition, an error signal generation unit for sensing an output voltage of the power supply to generate an error signal, and a control unit for enabling the PFC unit to operate in a burst mode by connecting the overvoltage protection stage and the feedback stage. When the error signal is smaller than a predetermined value, the DC/DC controller generates the burst mode operation signal. When the link voltage fed back to the feedback stage exceeds a threshold voltage of the overvoltage protection stage, the PFC controller deactivates the PFC unit.

5 Claims, 6 Drawing Sheets

[FIG. 1]
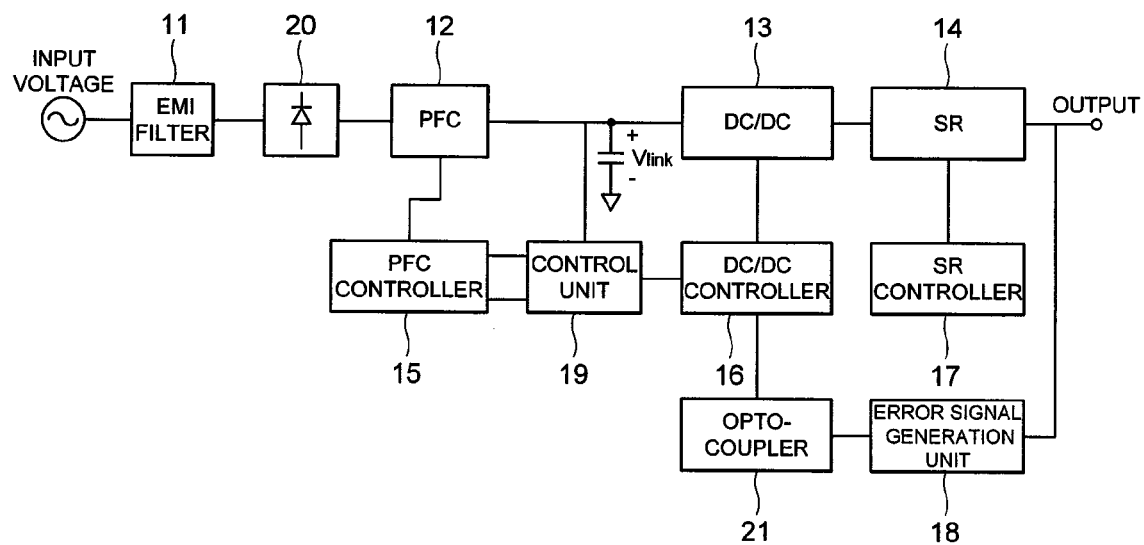

[FIG. 2]
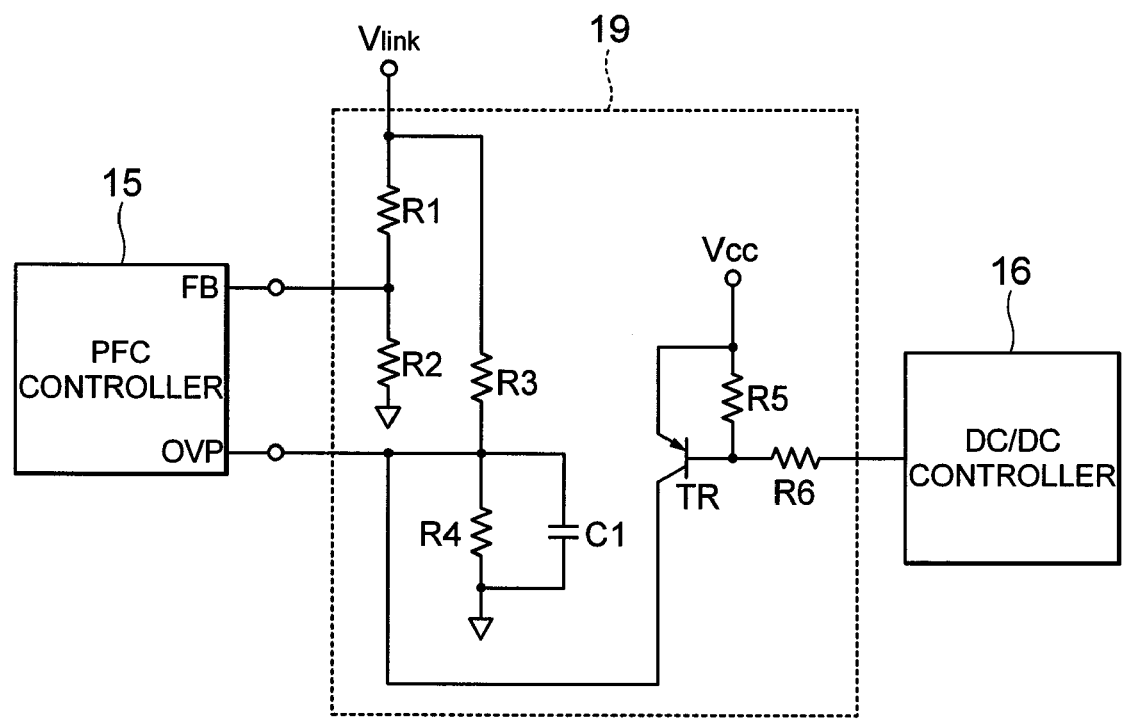

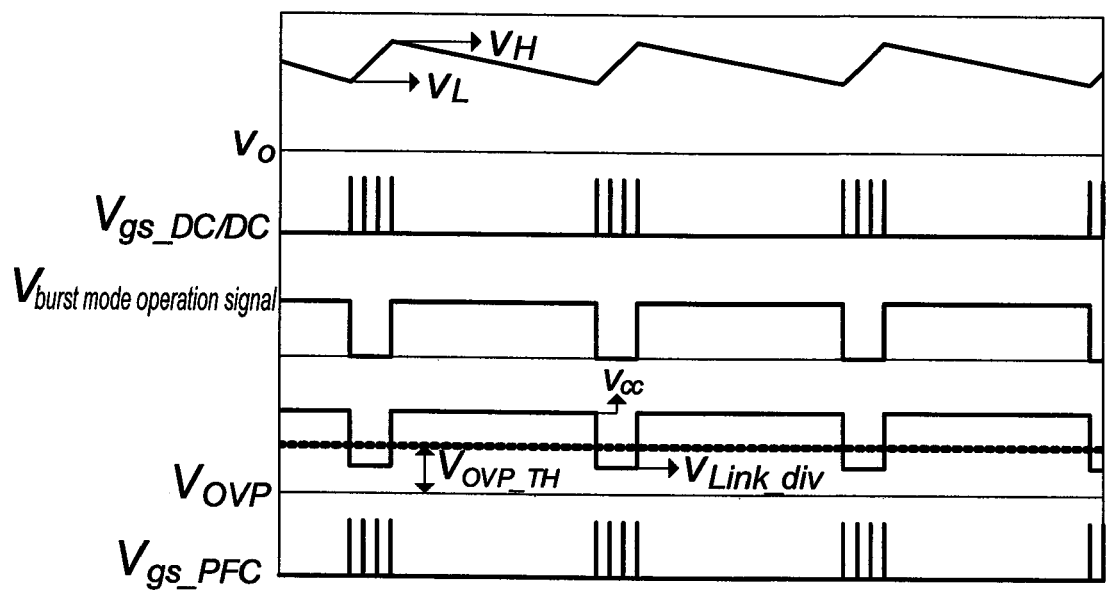
[FIG. 3]

[FIG. 4]
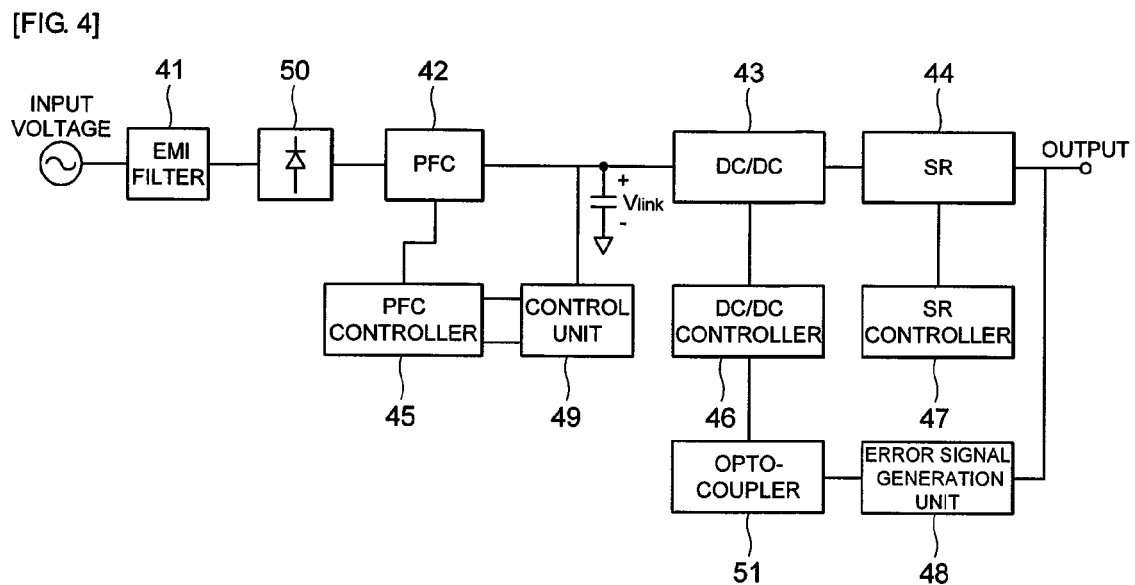

[FIG. 5]
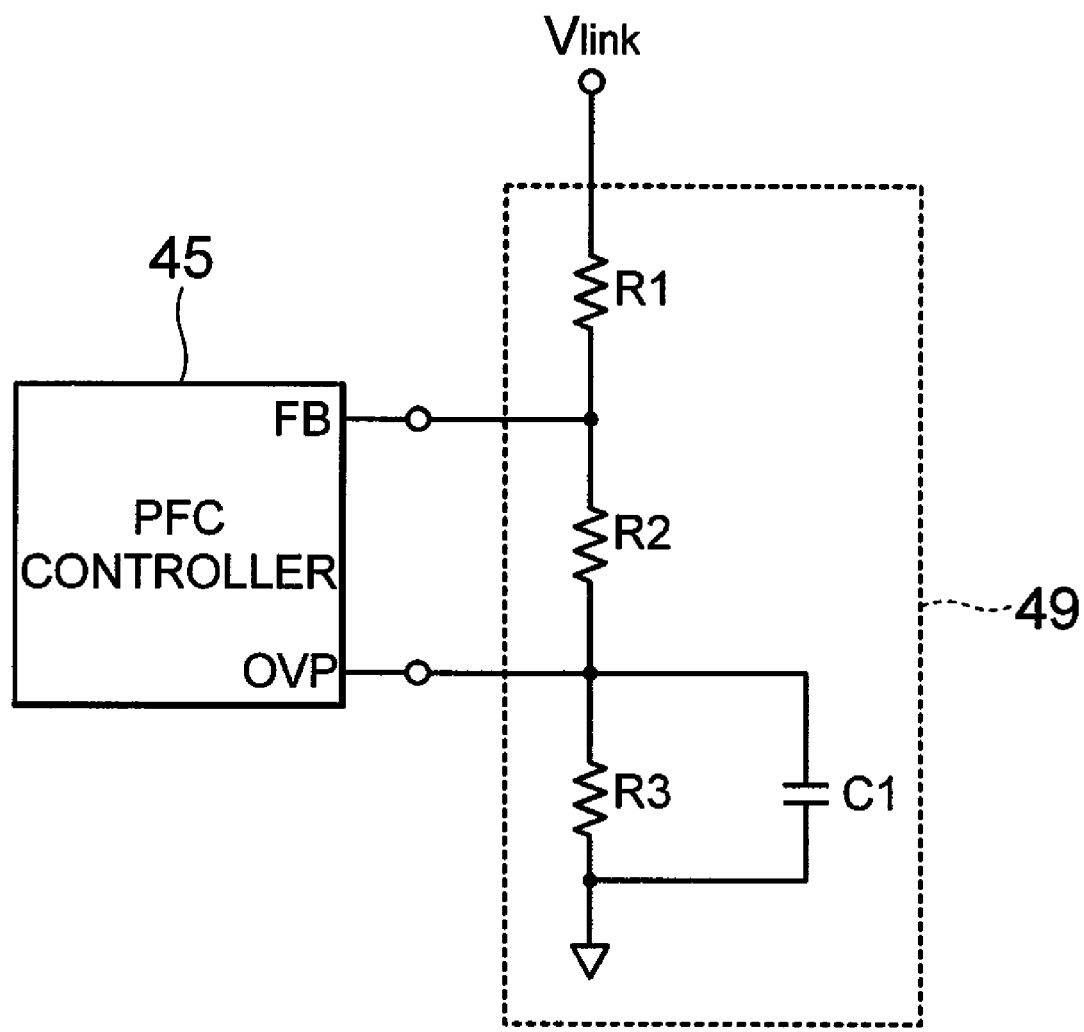

[FIG. 6]
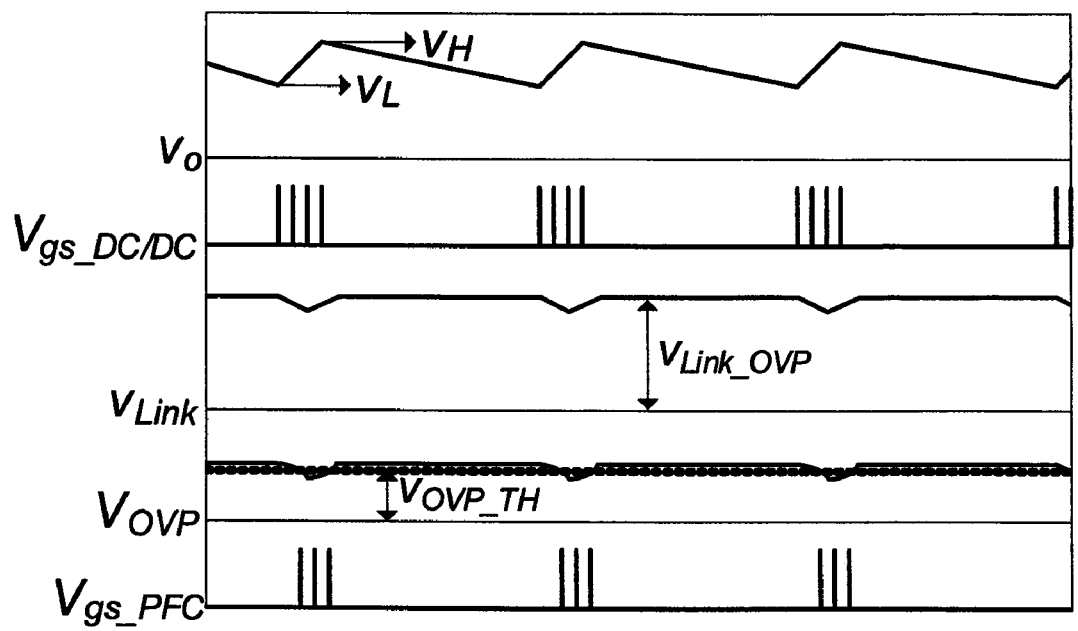

SWITCHING MODE POWER SUPPLY FOR REDUCING STANDBY POWER

CROSS-REFERENCE TO RELATED APPLICATIONS

This application claims the benefit of Korean Patent Application No. 10-2008-0130094 filed with the Korea Intellectual Property Office on Dec. 19, 2008, the disclosure of which is incorporated herein by reference.

BACKGROUND OF THE INVENTION

1. Field of the Invention

The present invention relates to a switching mode power supply; and, more particularly, to a switching mode power supply for reducing standby power to operate a PFC unit as well as a DC/DC unit in a burst mode in no-load or a light load.

2. Description of the Related Art

It is general that a high power density switching mode power supply is a two stage converter consisting of a PFC (Power Factor Correction) unit for taking full charge of improvement of power factor and harmonic regulation and a DC/DC unit for obtaining a desired output voltage.

In such a two stage converter, although a boost converter is often employed as the PFC unit, a buck converter is also used in order to reduce a withstanding voltage of a link voltage. Further, as the DC/DC unit, a forward converter, a converter operating by a pulse width modulation method such as a half bridge converter, a quasi-resonant flyback converter with an improved switching characteristic, and an LLC resonant converter are used.

Meanwhile, because the high power density switching mode power supply is frequently used in a home device, the study for reducing standby power has been progressed actively to meet regulation such as Energy Star.

Therefore, a recent DC/DC controller employs a burst mode type in order to minimize power consumption in no-load or a light load.

However, the PFC unit has a problem in that because a burst mode is not applied to a PFC controller operating in a CCM (Continuous Conduction Mode) or a BCM (Boundary Conduction Mode), a power switch of the PFC unit continuously operates even in the no-load or the light load, which causes serious switching loss.

SUMMARY OF THE INVENTION

The present invention has been invented in order to overcome the above-described problems and it is, therefore, an object of the present invention to provide a switching mode power supply for reducing standby power capable of minimizing power consumption by operating a PFC unit as well as a DC/DC unit in a burst mode in no-load or a light load.

In accordance with one aspect of the present invention to achieve the object, there is provided a switching mode power supply for reducing standby power including an EMI (Electro-Magnetic Interference) filter unit connected to an input power source, for suppressing a high frequency noise component, a PFC (Power Factor Correction) unit connected to the EMI filter unit, a DC/DC unit connected to the PFC unit for converting a direct-current input voltage from the PFC unit into a direct-current output voltage of the power supply, a PFC controller connected to the PFC unit for controlling the PFC unit, the PFC controller including a feedback stage to which a link voltage at an output side of the PFC unit is fed back and an overvoltage protection stage, a DC/DC controller connected to the DC/DC unit for controlling the DC/DC unit and generating a burst mode operation signal in a light-load or no-load condition, an error signal generation unit connected to an output terminal of the power supply for sensing the output voltage of the power supply to generate an error signal and then transmitting the error signal to the DC/DC controller, and a control unit for enabling the PFC unit to operate in a burst mode for itself by connecting the overvoltage protection stage and the feedback stage of the PFC controller. When the error signal received from the error signal generation unit is smaller than a predetermined value, the DC/DC controller determines that the output terminal is in the light-load or no-load condition and generates the burst mode operation signal. Upon receiving the burst mode operation signal, the DC/DC unit operates in a burst mode. When the link voltage fed back to the feedback stage exceeds a threshold voltage of the overvoltage protection stage, the PFC controller deactivates the PFC unit.

In accordance with the present invention, if the received error signal is below a predetermined size, the DC/DC controller recognizes that an output stage is in a light load or no-load, generates the burst mode operation signal and enables the DC/DC unit to operate in the burst mode.

In accordance with the present invention, the error signal generated in the error signal generation unit can be transmitted to the DC/DC controller through an opto-coupler.

In accordance with the present invention, the switching mode power supply for reducing the standby power further includes a rectification unit for rectifying an input voltage passing through the EMI filter unit between the EMI filter unit and the PFC unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a block diagram showing a switching mode power supply for reducing standby power in accordance with a first embodiment of the present invention;

FIG. 2 is a circuit diagram illustrating a control unit of the switching mode power supply for reducing the standby power in accordance with the first embodiment of the present invention;

FIG. 3 is a graph illustrating operation waveforms of the switching mode power supply for reducing the standby power in accordance with the first embodiment of the present invention;

FIG. 4 is a block diagram showing a switching mode power supply for reducing standby power in accordance with a second embodiment of the present invention;

FIG. 5 is a circuit diagram illustrating a control unit of the switching mode power supply for reducing the standby power in accordance with the second embodiment of the present invention; and FIG. 6 is a graph illustrating operation waveforms of the switching mode power supply for reducing the standby power in accordance with the second embodiment of the present invention.

DETAILED DESCRIPTION OF THE PREFERABLE EMBODIMENTS

The present invention can include several embodiments through various modifications, wherein specific embodiments are shown in the accompanying drawings and will be described in detail in Detailed Description of the Preferable Embodiments. However, it should be understood that the present invention is not limited to the specific embodiments and includes all modifications, equivalents and substitutions pertaining to the spirit and the technical scope of the present invention. In description of the present invention, if it is determined that the gist of the present invention becomes vague due to detailed description of related published techniques, the detailed description thereof will be omitted.

Although terms such as "first" and "second" can be used to describe various components, the components should not be limited by the terms. The terms are used only to distinguish one component from the other components.

The terms of the present invention are used only to describe the specific embodiments but they are not aimed at limiting the present invention. A singular form includes a plural form as long as the singular form clearly does not mean a different thing from the plural form. It should be understood that in the present invention, terms such as "include" or "have" specify existence of a characteristic, a figure, a step, an operation, a component, a part or a combination thereof described in the specification and do not previously exclude existence or possibility of addition of one or more different characteristics, figures, steps, operations, components, parts or combinations thereof.

Hereafter, embodiments of a switching mode power supply for reducing standby power in accordance with the present invention will be described in detail with reference to the accompanying drawings. In describing the embodiments with reference to the accompanying drawings, the same or corresponding component is represented by the same reference numeral and overlapping description thereof will be omitted.

First Embodiment

FIG. 1 is a block diagram showing a switching mode power supply for reducing standby power in accordance with a first embodiment of the present invention, FIG. 2 is a circuit diagram illustrating a control unit of the switching mode power supply for reducing the standby power in accordance with the first embodiment of the present invention and FIG. 3 is a graph illustrating operation waveforms of the switching mode power supply for reducing the standby power in accordance with the first embodiment of the present invention.

Referring to FIGS. 1 to 3, the switching mode power supply for reducing the standby power in accordance with the first embodiment of the present invention includes an EMI (Electro-Magnetic Interference) filter unit 11, a PFC(Power Factor Correction) unit 12, a DC/DC unit 13, a synchronous rectifier unit 14, a PFC controller 15, a DC/DC controller 16, a synchronous rectifier controller 17, an error signal generation unit 18, and a control unit 19.

The EMI filter unit 11 can play a role of suppressing a high frequency noise component generated outside and a high frequency noise component generated inside by being connected to an input power source.

The PFC unit 12 can take full charge of improvement of power factor and harmonic regulation by being connected to the EMI filter unit 11.

Further, a rectification unit 20 can further be included between the EMI filter unit 11 and the PFC unit 12 to rectify an input voltage passing through the EMI filter unit 11.

The DC/DC unit 13 is connected to the PFC unit 12 and can employ a forward converter, a converter operating by a pulse width modulation method such as a half bridge converter, a quasi-resonant flyback converter with an improved switching characteristic, and an LLC resonant converter in order to obtain desired output.

The synchronous rectifier unit 14 is connected to the DC/DC unit 13 and can reduce conduction loss due to a transformer secondary rectification stage.

The PFC controller 15 can control operation of the PFC unit 12 by being connected to the PFC unit 12. Further, the PFC controller 15 has a feedback stage for feedbacking a link voltage which is positioned at an output side of the PFC unit 12 and an overvoltage protection stage for protecting a circuit if an overvoltage is applied.

The DC/DC controller 16 can control operation of the DC/DC unit 13 by being connected to the DC/DC unit 13. Further, the DC/DC controller 16 can generate a burst mode operation signal according to the following error signal.

The synchronous rectifier controller 17 can control operation of a synchronous rectifier by being connected to the synchronous rectifier 14.

The error signal generation unit 18 can sense an output voltage by being connected to an output stage, generate an error signal and then transmit the error signal to the DC/DC controller 16.

At this time, the generated error signal can be transmitted to the DC/DC controller 16 through an opto-coupler 21.

Further, when the error signal generated in the error signal generation unit 18 is applied to the DC/DC controller 16 through the opto-coupler 21, in case that the received error signal is below a predetermined size, the DC/DC controller 16 recognizes that the output stage is in a light load or no-load and generates the burst mode operation signal. The DC/DC controller 16 can operate the DC/DC unit 13 in a burst mode according to the burst mode operation signal.

The control unit 19 can synchronize the DC/DC unit 13 and the PFC unit 12 so that the PFC unit 12 also operates in the burst mode in case that the DC/DC unit 13 operates in the burst mode by being connected to the DC/DC controller 16 and the overvoltage protection stage of the PFC controller 15.

Further, referring to FIGS. 2 and 3, the control unit 19 can include a transistor, a capacitor, and a plurality of resistors. If the DC/DC unit 13 operates in the burst mode, an output voltage is in a predetermined voltage range(VL~VH) and so the burst mode operation signal has a square wave signal. At this time, the overvoltage protection stage of the PFC controller 15 is connected to series resistors for measuring the link voltage and connected to a Vcc power source and a transistor which is connected to the burst mode operation signal generated in the DC/DC controller 16 at the same time. Therefore, if the output voltage reaches VH, a voltage close to Vcc is applied through the transistor to the overvoltage protection stage of the PFC controller 15 by the burst mode operation signal, which exceeds a threshold voltage of the overvoltage protection stage to stop operation of the PFC controller 15. Thereafter, if the output voltage reaches VL again, the transistor is turned off by the burst mode operation signal to stop application of the Vcc voltage to the overvoltage protection stage and the link voltage distributed to the series resistors is applied to the overvoltage protection stage to return to a normal state, so that the power switch of the PFC unit 12 supplies electric power.

In other words, the switching mode power supply for reducing the standby power in accordance with the first embodiment of the present invention can be applied to all commercial PFC control ICs by receiving the burst mode operation signal of the DC/DC controller 16 in order to link with the overvoltage protection stage of the PFC controller 15.

Second Embodiment

FIG. 4 is a block diagram showing a switching mode power supply for reducing standby power in accordance with a second embodiment of the present invention, FIG. 5 is a circuit diagram illustrating a control unit of the switching mode power supply for reducing the standby power in accordance with the second embodiment of the present invention and FIG. 6 is a graph illustrating operation waveforms of the switching mode power supply for reducing the standby power in accordance with the second embodiment of the present invention.

Referring to FIGS. 4 to 6, the switching mode power supply for reducing the standby power in accordance with the second embodiment of the present invention includes an EMI (Electro-Magnetic Interference) filter unit 41, a PFC(Power Factor Correction) unit 42, a DC/DC unit 43, a synchronous rectifier unit 44, a PFC controller 45, a DC/DC controller 46, a synchronous rectifier controller 47, an error signal generation unit 48, and a control unit 49.

The EMI filter unit 41 can play a role of suppressing a high frequency noise component generated outside and a high frequency noise component generated inside by being connected to an input power source.

The PFC unit 42 can take full charge of improvement of power factor and harmonic regulation by being connected to the EMI filter unit 41.

Further, a rectification unit 50 can further be included between the EMI filter unit 41 and the PFC unit 42 to rectify an input voltage passing through the EMI filter unit 41.

The DC/DC unit 43 is connected to the PFC unit 42 and can employ a forward converter, a converter operating by a pulse width modulation method such as a half bridge converter, a quasi-resonant flyback converter with an improved switching characteristic, and an LLC resonant converter in order to obtain desired output.

The synchronous rectifier unit 44 is connected to the DC/DC unit 43 and can reduce conduction loss due to a transformer secondary rectification stage.

The PFC controller 45 can control operation of the PFC unit 42 by being connected to the PFC unit 42. Further, the PFC controller 45 has a feedback stage for feedbacking a link voltage which is positioned at an output side of the PFC unit 42 and an overvoltage protection stage for protecting a circuit if an overvoltage is applied.

The DC/DC controller 46 can control operation of the DC/DC unit 43 by being connected to the DC/DC unit 43. Further, the DC/DC controller 46 can generate a burst mode operation signal according to the following error signal.

The synchronous rectifier controller 47 can control operation of a synchronous rectifier by being connected to the synchronous rectifier 44.

The error signal generation unit 48 can sense an output voltage by being connected to an output stage, generate an error signal and then transmit the error signal to the DC/DC controller 46.

At this time, the generated error signal can be transmitted to the DC/DC controller 46 through an opto-coupler 51.

Further, when the error signal generated in the error signal generation unit 48 is applied to the DC/DC controller 46 through the opto-coupler 51, in case that the received error signal is below a predetermined size, the DC/DC controller 46 recognizes that the output stage is in a light load or no-load and generates the burst mode operation signal. The DC/DC controller 46 can operate the DC/DC unit 43 in a burst mode according to the burst mode operation signal.

The control unit 49 enables the PFC unit 42 to operate in the burst mode for itself by separately connecting the overvoltage protection stages and the feedback stage of the PFC controller 45. Further, the control unit 49 can include a capacitor and a plurality of resistors.

Looking at an operation with reference to FIGS. 5 and 6, at first, if a minimum ratio of the PFC controller 45 is limited to approximately 5%, the PFC unit 42 supplies a predetermined amount of power to a link capacitor by the minimum duty ratio even in a light load or no-load. Further, since the DC/DC unit 43 is in a state of the light load or no-load, it supplies power to an output stage at intervals while operating in the burst mode by the burst mode operation signal generated in the DC/DC controller 46 in order to increase the link voltage. At this time, if a threshold voltage of the overvoltage protection stage of the PFC controller 45 is set to be very close to the link voltage, the PFC unit 42 can match the link voltage with an overvoltage protection voltage while operating in the burst mode by an overvoltage protection function.

More specifically, the PFC controller 45 limits the minimum duty ratio of a power switch gate signal to approximately 5% by making a slope of a ramp waveform to generate a PWM signal small or limiting the minimum size of an error signal of the link voltage. Feedback resistors R1~R3 are connected in series to regulate the link voltage of the PFC unit 42, a connection point of the resistors R1 and R2 is connected to the feedback stage of the PFC controller 45, and a connection point of the resistors R2 and R3 is connected to a capacitor C1 and the overvoltage protection stage of the PFC controller 45 in parallel.

If the switching mode power supply for reducing the standby power in accordance with the second embodiment of the present invention is in the state of the light load or no-load, the DC/DC unit 43 operates in the burst mode in order to supply the power to a transformer secondary output stage at intervals. At this time, since the PFC controller 45 is in an overvoltage protection state, the PFC unit 42 is stopped, so that the link voltage is gradually reduced. However, since a low-pass filter including a capacitor C3 and the resistors R1~R3 is connected to the overvoltage protection stage of the PFC controller 45, it is impossible to approach a normal state immediately. If a voltage of the overvoltage protection stage is reduced below the threshold voltage, the PFC controller 45 transmits the power from an input stage to the link capacitor while operating at the above-mentioned minimum duty ratio. As a result, the link voltage as output of the PFC unit 42 is gradually increased and if reaching the overvoltage protection voltage again, the operation of the PFC controller 45 is stopped.

The switching mode power supply for reducing the standby power in accordance with the second embodiment of the present invention has an advantage in that it is possible to implement a circuit capable of simply minimizing the standby power by using all of general ICs since the PFC controller 45 can operate in the burst mode for itself independent of the DC/DC controller 46.

As described above, the present invention can reduce switching loss of the power switch of the PFC unit by applying the burst mode to all of the PFC controllers by operating the PFC unit as well as the DC/DC unit in the burst mode in the no-load or the light load.

As described above, although the preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:
1. A switching mode power supply for reducing standby power, comprising:

an EMI (Electro-Magnetic Interference) filter unit connected to an input power source, for suppressing a high frequency noise component;

a PFC (Power Factor Correction) unit connected to the EMI filter unit;

a DC/DC unit connected to the PFC unit for converting a direct-current input voltage from the PFC unit into a direct-current output voltage of the power supply;

a PFC controller connected to the PFC unit for controlling the PFC unit, the PFC controller including
 a feedback stage to which a link voltage at an output side of the PFC unit is fed back, and
 an overvoltage protection stage;

a DC/DC controller connected to the DC/DC unit for controlling the DC/DC unit and generating a burst mode operation signal in a light-load or no-load condition;

an error signal generation unit connected to an output terminal of the power supply for sensing the output voltage of the power supply to generate an error signal and then transmitting the error signal to the DC/DC controller; and a control unit for enabling the PFC unit to operate in a burst mode for itself by connecting the overvoltage protection stage and the feedback stage of the PFC controller, wherein when the error signal received from the error signal generation unit is smaller than a predetermined value, the DC/DC controller determines that the output terminal is in the light-load or no-load condition and generates the burst mode operation signal, upon receiving the burst mode operation signal, the DC/DC unit operates in a burst mode, and when the link voltage fed back to the feedback stage exceeds a threshold voltage of the overvoltage protection stage, the PFC controller deactivates the PFC unit.

2. The switching mode power supply of claim 1, wherein the error signal generated in the error signal generation unit is transmitted to the DC/DC controller through an opto-coupler.

3. The switching mode power supply of claim 1, further comprising:
 a rectification unit for rectifying an input voltage passing through the EMI filter unit between the EMI filter unit and the PFC unit.

4. The switching mode power supply of claim 1, wherein the control unit includes a first resistor, a second resistor, a third resistor, and a capacitor,
 the first to third resistors are connected in series,
 a first terminal of the first resistor is connected to an output terminal of the PFC unit,
 a second terminal of the first resistor is connected to a feedback terminal of the PFC controller,
 a first terminal of the second resistor is connected to the feedback terminal of the PFC controller,
 a second terminal of the second resistor is connected to an overvoltage protection terminal of the PFC controller,
 a first terminal of the third resistor is connected to the overvoltage protection terminal of the PFC controller,
 a second terminal of the third resistor is connected to a ground, and
 the capacitor is connected to the third resistor in parallel.

5. The switching mode power supply of claim 1, further comprising:
 a synchronous rectifier unit connected to the DC/DC unit for reducing a conduction loss due to a secondary stage of a transformer of the DC/DC unit; and
 a synchronous rectifier controller connected to the synchronous rectifier unit for controlling the synchronous rectifier unit.

* * * * *